US011929201B2

(12) United States Patent
Kitashima et al.

(10) Patent No.: US 11,929,201 B2
(45) Date of Patent: Mar. 12, 2024

(54) SURFACE MOUNT INDUCTOR AND METHOD FOR MANUFACTURING THE SAME

(71) Applicant: Murata Manufacturing Co., Ltd., Kyoto-fu (JP)

(72) Inventors: Yuki Kitashima, Nagaokakyo (JP); Masaki Kitajima, Nagaokakyo (JP); Takeo Ohaga, Nagaokakyo (JP); Takeshi Shimada, Nagaokakyo (JP); Yoshiaki Hirama, Nagaokakyo (JP); Daigo Mizumura, Nagaokakyo (JP); Ryota Watanabe, Nagaokakyo (JP); Masato Koike, Nagaokakyo (JP); Yuusuke Morita, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/179,896

(22) Filed: Mar. 7, 2023

(65) Prior Publication Data

US 2023/0207187 A1 Jun. 29, 2023

Related U.S. Application Data

(63) Continuation of application No. 16/264,496, filed on Jan. 31, 2019, now abandoned.

(30) Foreign Application Priority Data

Mar. 30, 2018 (JP) ................................ 2018-069270

(51) Int. Cl.
*H01F 27/28* (2006.01)
*H01F 27/255* (2006.01)
(Continued)

(52) U.S. Cl.
CPC ......... *H01F 27/292* (2013.01); *H01F 27/255* (2013.01); *H01F 27/28* (2013.01); *H01F 41/0246* (2013.01); *H01F 41/04* (2013.01)

(58) Field of Classification Search
CPC ...... H01F 27/292; H01F 27/255; H01F 27/28; H01F 41/0246; H01F 41/04;
(Continued)

(56) References Cited

U.S. PATENT DOCUMENTS 11,094,447 B2 8/2021 Shimoichi
2009/0128275 A1 5/2009 Yagasaki et al.
(Continued)

FOREIGN PATENT DOCUMENTS

CN 103295754 A 9/2013
CN 103339695 A 10/2013
(Continued)

OTHER PUBLICATIONS

An Office Action; "Notice of Reasons for Refusal," mailed by the Japanese Patent Office dated Sep. 8, 2020, which corresponds to Japanese Patent Application No. 2018-069270 and is related to U.S. Appl. No. 16/264,496 with English language translation.
(Continued)

*Primary Examiner* — Bickey Dhakal
*Assistant Examiner* — Kazi S Hossain
(74) *Attorney, Agent, or Firm* — Studebaker & Brackett PC

(57) ABSTRACT

A surface mount inductor includes a coil including a wound portion and a feeder end portion drawn out from the wound portion, a compact that contains a magnetic powder and that encapsulates the coil, and an external terminal disposed on the compact and connected to the coil. The compact has surfaces including two pressed surfaces, opposing each other in a direction of an axis of the wound portion and formed by being pressed in the direction of the axis, and a non-pressed surface, adjacent to the two surfaces and not pressed. The coil is disposed so that the axis of the wound portion is parallel to a mount surface of the compact. The mount surface is included in the non-pressed surface, the feeder end portion is exposed from the mount surface, and the external terminal is formed on only the non-pressed surface and connected to the feeder end portion.

17 Claims, 8 Drawing Sheets

(51) Int. Cl.
*H01F 27/29* (2006.01)
*H01F 41/02* (2006.01)
*H01F 41/04* (2006.01)

(58) Field of Classification Search
CPC ............... H01F 2017/048; H01F 17/04; H01F 27/2852; H01F 27/29; H01F 41/02
USPC ................................. 336/200, 198, 192, 232
See application file for complete search history.

(56) References Cited

U.S. PATENT DOCUMENTS

| | | | |
|---|---|---|---|
| 2013/0015937 A1 | 1/2013 | Seko | |
| 2013/0307655 A1 | 11/2013 | Saito et al. | |
| 2014/0062639 A1 | 3/2014 | Sasamori et al. | |
| 2016/0351314 A1* | 12/2016 | Jeong | H01F 17/0013 |
| 2017/0103846 A1 | 4/2017 | Yoneda | |
| 2017/0207018 A1* | 7/2017 | Jung | H01F 27/2804 |
| 2018/0096778 A1 | 4/2018 | Yatabe et al. | |
| 2018/0286561 A1* | 10/2018 | Shimoichi | H01F 41/10 |
| 2019/0326041 A1* | 10/2019 | Kawaguchi | H01F 1/06 |

FOREIGN PATENT DOCUMENTS

| | | | |
|---|---|---|---|
| JP | H03-113833 | U | 11/1991 |
| JP | H11-288824 | A | 10/1999 |
| JP | 2009-267350 | A | 11/2009 |
| JP | 2010-147272 | A | 7/2010 |
| JP | 2012-160507 | A | 8/2012 |
| JP | 2017-059592 | A | 3/2017 |
| WO | 2016/121575 | A1 | 8/2016 |

OTHER PUBLICATIONS

An Office Action mailed by China National Intellectual Property Administration dated Dec. 25, 2020, which corresponds to Chinese Patent Application No. 201910083329.1 and is related to U.S. Appl. No. 16/264,496, with English language translation.

* cited by examiner

SURFACE MOUNT INDUCTOR AND METHOD FOR MANUFACTURING THE SAME

CROSS-REFERENCE TO RELATED APPLICATIONS

This application is a Continuation of U.S. patent application Ser. No. 16/264,496 filed Jan. 31, 2019, which claims benefit of priority to Japanese Patent Application No. 2018-069270 filed Mar. 30, 2018, the entire contents of which are incorporated herein by reference.

BACKGROUND

Technical Field

The present disclosure relates to a surface mount inductor and a method for manufacturing the same.

Background Art

An example of a surface mount inductor is described in Japanese Patent Application Publication No. 2010-147272. This surface mount inductor includes a coil, a compact that encapsulates the coil therein, and external terminals disposed on the compact and connected to the coil.

The coil includes a wound portion and feeder end portions drawn out from the wound portion. An axis of the wound portion is disposed to be perpendicular to the mount surface of the compact. The external terminals are disposed on the mount surface of the compact and side surfaces of the compact adjacent to the mount surface. The feeder end portions are exposed to the outside from the side surfaces of the compact and connected to the external terminals.

The above-described existing surface mount inductor is found to have the following problem in an actual use.

The feeder end portions are exposed to the outside from the side surfaces of the compact and connected to the external terminals. Thus, when the surface mount inductor is mounted on a mount board at its mount surface, the current flows over a long flow path between the feeder end portions and the mount board through the external terminals. This structure thus has a problem of an increase in direct current resistance of the external terminals.

A conceivable example to address this problem is to expose the feeder end portions from the mount surface. However, since the coil is disposed so that the axis of the wound portion is perpendicular to the mount surface of the compact, the feeder end portions need to be subjected to forming processing involving a considerable deformation, which causes a problem in quality of conformance.

SUMMARY

Accordingly, the present disclosure provides a surface mount inductor that can restrict an increase in direct current resistance of an external terminal and that can ensure the quality of conformance.

A surface mount inductor according to an aspect of the present disclosure includes a coil including a wound portion and a feeder end portion drawn out from the wound portion; a compact that contains a magnetic powder and that encapsulates the coil therein; and an external terminal disposed on the compact and connected to the coil. The compact has surfaces including two pressed surfaces, which oppose each other in a direction of an axis of the wound portion and which are formed by being pressed in the direction of the axis, and a non-pressed surface, which is adjacent to the two surfaces and which is not pressed. The coil is disposed so that the axis of the wound portion is parallel to a mount surface of the compact, the mount surface being included in the non-pressed surface, the feeder end portion is exposed from the mount surface of the compact, and the external terminal is formed on only the non-pressed surface of the compact and connected to the feeder end portion.

In the surface mount inductor of the present disclosure, the feeder end portions are exposed from the mount surface of the compact and connected to the external terminals. Thus, when the surface mount inductor is mounted on a mount board at its mount surface, the current flow path between the feeder end portions and the mount board through the external terminals can be shortened. This structure can thus restrict an increase in direct current resistance of the external terminals.

The coil is disposed so that the axis of the wound portion is parallel to the mount surface of the compact. Thus, the feeder end portions can be exposed from the mount surface without being subjected to forming processing involving a considerable deformation, and the quality of conformance can be secured.

The external terminal is formed on only the non-pressed surface of the compact. This structure can thus enhance the withstanding voltage or the ESD resistance than the structure including an external terminal formed on the pressed surface.

The external terminal is formed on only the non-pressed surface of the compact. Thus, the external terminal does not cross a direction of an axis of the wound portion. This structure can thus prevent a magnetic flux of the coil from being blocked by the external terminal.

In a surface mount inductor according to an embodiment, the mount surface of the compact includes an irregular interface. Here, the irregular interface includes multiple gaps arranged irregularly. According to the embodiment, the withstanding voltage at the mount surface of the compact can be enhanced.

In a surface mount inductor according to an embodiment, the coil has two feeder end portions each corresponding to the feeder end portion. The irregular interface extends from an exposed portion of one of the feeder end portions exposed from the mount surface to an exposed portion of the other feeder end portion exposed from the mount surface. According to the embodiment, the irregular interface is disposed between the exposed portions of the two feeder end portions across which a high voltage is applied. Thus, the withstanding voltage between the exposed portions of the two feeder end portions can be enhanced.

In a surface mount inductor according to an embodiment, the coil has two feeder end portions each corresponding to the feeder end portion. An exposed portion of one of the feeder end portions exposed from the mount surface and an exposed portion of the other feeder end portion exposed from the mount surface extend in opposite directions. According to the embodiment, the exposed portion of one feeder end portion and the exposed portion of the other feeder end portion can be spaced apart from each other, so that the withstanding voltage can be enhanced.

In a surface mount inductor according to an embodiment, the exposed portion of one of the feeder end portions and the exposed portion of the other feeder end portion extend to a side surface included in the non-pressed surface adjacent to the mount surface. According to the embodiment, the area of the exposed portion of one feeder end portion and the area of the exposed portion of the other feeder end portion can be increased. Thus, the contact area between the feeder end portions and the external terminal can be increased, and the bonding strength between the feeder end portions and the external terminal can be enhanced.

In a surface mount inductor according to an embodiment, the external terminal is formed in a substantially letter L shape extending from the mount surface of the compact to the side surface, and a portion of the external terminal disposed on the side surface has a height greater than or equal to a quarter of a height of the side surface. According to the embodiment, the amount of a fillet disposed on the portion of the external terminal disposed on the side surface can be appropriately controlled.

In a surface mount inductor according to an embodiment, the coil has two feeder end portions each corresponding to the feeder end portion, and the two feeder end portions are drawn out of the wound portion so as not to cross each other. According to the embodiment, the two feeder end portions do not cross each other, so that the withstanding voltage can be enhanced.

A surface mount inductor according to an embodiment includes a coil including a wound portion and a feeder end portion drawn out from the wound portion, a compact that contains a magnetic powder and that encapsulates the coil therein, and an external terminal disposed on the compact and connected to the coil. The coil is disposed so that an axis of the wound portion is parallel to a mount surface of the compact, and the feeder end portion is exposed from the mount surface of the compact and connected to the external terminal. The mount surface of the compact includes an irregular interface. According to the embodiment, the feeder end portion is exposed from the mount surface of the compact and connected to the external terminal. Thus, when the surface mount inductor is mounted on the mount board at its mount surface, the current flow path between the feeder end portion and the mount board through the external terminal can be shortened. An increase in direct current resistance of the external terminal can be restricted.

The coil is disposed so that the axis of the wound portion is parallel to the mount surface of the compact. Thus, the feeder end portions can be exposed from the mount surface without being subjected to forming processing involving a considerable deformation. Thus, the quality of conformance can be secured.

In addition, the mount surface of the compact includes an irregular interface. Thus, the withstanding voltage at the mount surface of the compact can be enhanced.

In a surface mount inductor according to an embodiment, the coil has two feeder end portions each corresponding to the feeder end portion. The irregular interface extends from an exposed portion of one of the feeder end portions exposed from the mount surface to an exposed portion of the other feeder end portion exposed from the mount surface. According to the embodiment, an irregular interface is disposed between the exposed portions of the two feeder end portions across which a high voltage is applied. Thus, the withstanding voltage between the exposed portions of the two feeder end portions can be enhanced.

A method for manufacturing a surface mount inductor according to an embodiment includes a step of enclosing a coil in a compact material containing a magnetic powder, and placing the coil in a die set. The coil includes a wound portion and a feeder end portion drawn out of the wound portion. The method further includes a step of pressing the compact material in a direction of an axis of the wound portion to form a compact that encapsulates the coil therein, and exposing the feeder end portion from a non-pressed surface of the compact; and a step of forming an external terminal on only the non-pressed surface of the compact and connecting the external terminal to the feeder end portion.

According to the embodiment, the feeder end portion is exposed from the non-pressed surface (referred to as a mount surface, below) of the compact, and connected to the external terminal. Thus, when the surface mount inductor is mounted on the mount board at its mount surface, the current flow path between the feeder end portion and the mount board through the external terminal can be shortened. An increase in direct current resistance of the external terminal can thus be restricted.

The coil is disposed so that the axis of the wound portion is parallel to the mount surface of the compact. Thus, the feeder end portions can be exposed from the mount surface without being subjected to forming processing involving a considerable deformation, and the quality of conformance can thus be secured.

The external terminal is formed on only the non-pressed surface of the compact. This structure can thus enhance the withstanding voltage or the ESD resistance than the structure including an external terminal formed on the pressed surface.

The external terminal is formed on only the non-pressed surface of the compact. Thus, the external terminal does not cross a direction of an axis of the wound portion. This structure can thus prevent a magnetic flux of the coil from being blocked by the external terminal.

In a surface mount inductor according to an aspect of the disclosure and with a method for manufacturing the same, an increase in direct current resistance of the external terminal can be restricted, whereby the quality of conformance can be ensured.

Other features, elements, characteristics and advantages of the present disclosure will become more apparent from the following detailed description of preferred embodiments of the present disclosure with reference to the attached drawings.

DETAILED DESCRIPTION

A surface mount inductor according to an aspect of the present disclosure will now be described in detail using illustrated embodiments. Some of the drawings may be schematic, and may be drawn with dimensions or ratios different from the actual ones.

First Embodiment

Figure 1:
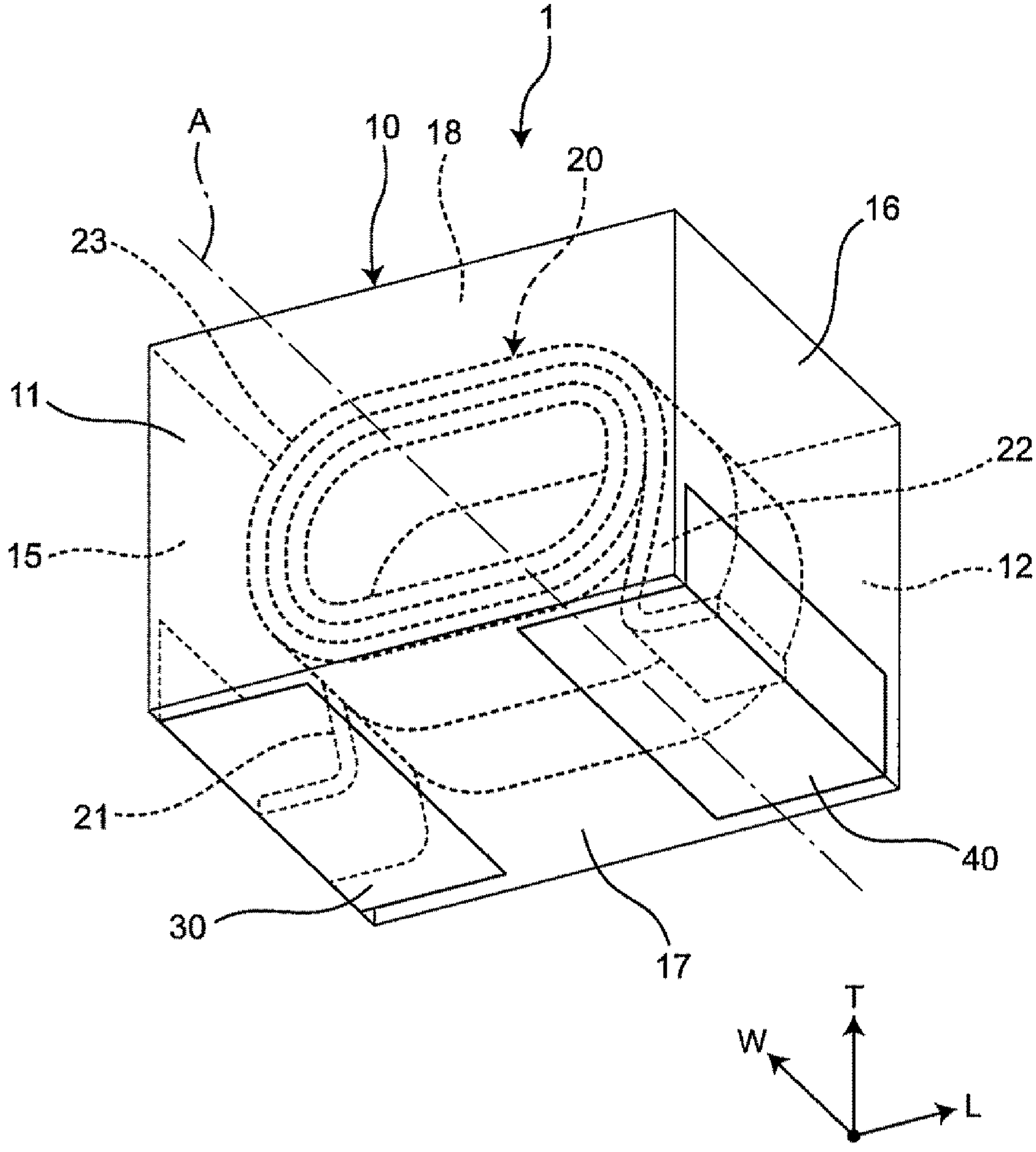
FIG. 1 is a perspective view of a surface mount inductor according to a first embodiment.

FIG. 1 is a perspective view of a surface mount inductor according to the first embodiment. As illustrated in FIG. 1, a surface mount inductor 1 includes a compact 10, a spiral coil 20, disposed inside the compact 10, and a first external terminal 30 and a second external terminal 40, which are disposed on the compact 10 and electrically connected to the coil 20.

The surface mount inductor 1 is electrically connected to a wire of a circuit board, not illustrated, through the first and second external terminals 30 and 40. The surface mount inductor 1 is used as, for example, an inductor or a transformer for a power circuit or a DC/DC converter circuit through which a large current flows, and installed in, for example, a car-mount advanced driver-assistance system (ADAS).

The compact 10 is substantially rectangular parallelepiped. The compact 10 has surfaces including a first end surface 11, a second end surface 12, opposing the first end surface 11, a first side surface 15, connected to the first end surface 11 and the second end surface 12, a second side surface 16, opposing the first side surface 15, a bottom surface 17, connected to the first side surface 15 and the second side surface 16, and a top surface 18, opposing the bottom surface 17. The bottom surface 17 is a mount surface of the surface mount inductor 1 mounted on the mount board.

Here, as illustrated in FIG. 1, an L direction is a direction in which the first side surface 15 and the second side surface 16 oppose each other, and a length direction of the surface mount inductor 1. A W direction is a direction in which the first end surface 11 and the second end surface 12 oppose each other, and a width direction of the surface mount inductor 1. A T direction is a direction in which the bottom surface 17 and the top surface 18 oppose each other, and a height direction of the surface mount inductor 1.

The compact 10 contains a magnetic powder and a resin. Examples of magnetic powders include an iron-based magnetic metal powder, such as an iron (Fe), Fe—Si based, Fe—Si—Cr-based, Fe—Si—Al-based, Fe—Ni—Al-based, or Fe—Cr—Al-based powder, a magnetic metal powder having a composite not containing iron, another magnetic metal powder having a composite containing iron, an amorphous magnetic metal powder, a magnetic metal powder having its surface coated with an insulator such as glass, a surface-reformed magnetic metal powder, a nanoscale magnetic metal powder, and ferrite. Examples of a resin include a thermosetting resin, such as an epoxy resin, a polyimide resin, or a phenol resin, a thermoplastic resin, such as a polyethylene resin or a polyamide resin, and a mixture of these. The compact 10 of the surface mount inductor according to the first embodiment is formed from, for example, a Fe—Si—Cr-based magnetic metal powder, used for a magnetic powder, and an epoxy resin, used for a resin. The compact 10 is sized to have dimensions, for example, within a range of a length of 2 mm, a width of 2.5 mm, and a height of 2 mm to a length of 5 mm, a width of 5 mm, and a height of 5 mm.

The first external terminal 30 and the second external terminal 40 are formed from an electrically conductive material such as Ag or Cu. The first external terminal 30 has a substantially letter L shape extending from the first side surface 15 to the bottom surface 17. The second external terminal 40 has a substantially letter L shape extending from the second side surface 16 to the bottom surface 17.

The coil 20 is spirally wound in two layers so that both end portions of a conducting wire are disposed on the outer circumference. The conducting wire is, for example, a flat wire having a flat cross section. The coil 20 is, for example, an air-core coil with a shorter diameter of 1.35 mm, a longer diameter of 2 mm, and a height of 1.21 mm.

The coil 20 includes a wound portion 23, which is spirally wound in two layers so that both end portions of the conducting wire are disposed on the outer circumference, and a first feeder end portion 21 and a second feeder end portion 22, which are both end portions of the conducting wire drawn out of the wound portion 23. The first feeder end portion 21 and the second feeder end portion 22 are drawn from opposing portions on the circumference of the wound portion 23 to oppose each other with the wound portion 23 interposed therebetween. The first feeder end portion 21 and the second feeder end portion 22 are drawn out from the outermost turn of the wound portion 23 in the winding direction. The first feeder end portion 21 and the second feeder end portion 22 are drawn from the wound portion 23 without crossing each other. The first feeder end portion 21 and the second feeder end portion 22, which do not cross each other, can improve the withstanding voltage.

The coil 20 is disposed so that the axis A of the wound portion 23 is parallel to the bottom surface (mount surface) 17 of the compact 10. The axis A of the wound portion 23 refers to the center axis of the spirally shape of the wound portion 23. The first feeder end portion 21 is exposed from the bottom surface 17 of the compact, and connected to the first external terminal 30. The second feeder end portion 22 is exposed from the bottom surface 17 of the compact, and connected to the second external terminal 40.

The compact 10 is formed by compressing a compact material containing a magnetic powder and a resin using a forming die set. Specifically, the compact 10 is formed by compressing the coil 20 enclosed in the compact material with a punch of the forming die set in the direction of the axis A of the wound portion 23. Thus, the surfaces of the compact 10 are constituted of two pressed surfaces, which oppose each other in the direction of the axis A of the wound portion 23 and which are formed by being pressed with the punch of the forming die set in the direction of the axis A, and non-pressed surfaces, which are adjacent to the two surfaces and not pressed with the punch of the forming die set. The two pressed surfaces are the first end surface 11 and the second end surface 12. The non-pressed surfaces are the first side surface 15, the second side surface 16, the bottom surface 17, and the top surface 18.

Specifically, the coil 20 is disposed so that the axis A of the wound portion 23 is parallel to the non-pressed surface (bottom surface 17) of the compact 10. The first and second feeder end portions 21 and 22 are exposed from the non-pressed surface (bottom surface 17) of the compact 10. The first and second external terminals 30 and 40 are formed on only the non-pressed surfaces (the first and second side surfaces 15 and 16, and the bottom surface 17) of the compact.

In the surface mount inductor 1, the first and second feeder end portions 21 and 22 are exposed from the bottom surface 17 (mount surface) of the compact 10, and connected to the first and second external terminals 30 and 40. Thus, when the surface mount inductor 1 is mounted on the mount board at its mount surface, the current flow path between the first feeder end portion 21 and the mount board through the first external terminal 30 can be shortened, and the current flow path between the second feeder end portion 22 and the mount board through the second external terminal 40 can be shortened. Thus, the surface mount inductor can have a direct current resistance of 4.88 mΩ, whereas an existing surface mount inductor having the first and second feeder end portions exposed from the side surfaces of the compact and connected to the first and second external terminals has a direct current resistance of 6.15 mΩ. The direct current resistance at the first and second external terminals 30 and 40 can thus be restricted from increasing.

The coil 20 is disposed so that the axis A of the wound portion 23 is parallel to the mount surface of the compact 10. Thus, the first and second feeder end portions 21 and 22 can be exposed from the mount surface without being subjected to forming processing involving a considerable deformation. Thus, the quality of conformance can be secured.

The first and second external terminals 30 and 40 are formed on only the non-pressed surfaces of the compact 10. Thus, the first and second external terminals 30 and 40 do not cross the direction of the axis A of the wound portion 23. This structure can prevent the magnetic flux of the coil 20 from being blocked by the first and second external terminals 30 and 40, and enhances the characteristics of the coil 20.

The compact 10 has two opposing pressed surfaces (the first end surface 11 and the second end surface 12). Thus, the variations of dimensions of the compact 10 other than that in the direction in which the two pressed surfaces oppose each other (W direction) can be reduced.

The first and second external terminals 30 and 40 are formed on only the non-pressed surfaces of the compact 10. Thus, the first and second external terminals 30 and 40 can enhance the withstanding voltage or electro-static discharge (ESD) resistance compared to those formed on the pressed surfaces.

Figure 2A:
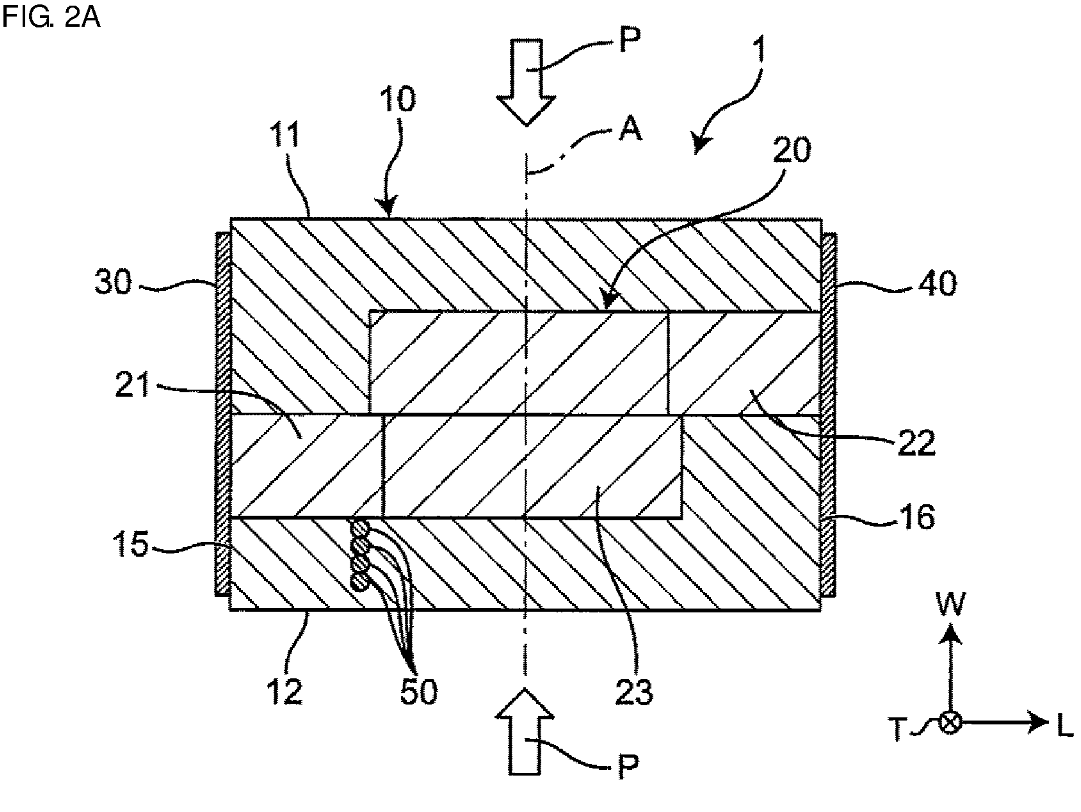
FIG. 2A illustrates the withstanding voltage of the surface mount inductor according to the first embodiment.

Specifically, when a magnetic metal powder is used as a magnetic powder that forms the compact 10, as illustrated in FIG. 2A, the compact 10 is pressed in the arrow direction P along the axis A. Here, multiple magnetic powder particles 50 constituting the compact 10 may come into contact with or come closer to each other in the arrow direction P than in other directions, and the insulation resistance may be lowered. Also in this case, since the first and second external terminals 30 and 40 are not disposed on the pressed surface (the first and second end surfaces 11 and 12), the first and second feeder end portions 21 and 22 and the first and second external terminals 30 and 40 are prevented from being short-circuited therebetween through the multiple magnetic powder particles 50 that come into contact with or come closer to each other than in other directions. Thus, the withstanding voltage or the ESD resistance can be enhanced.

Figure 2B:
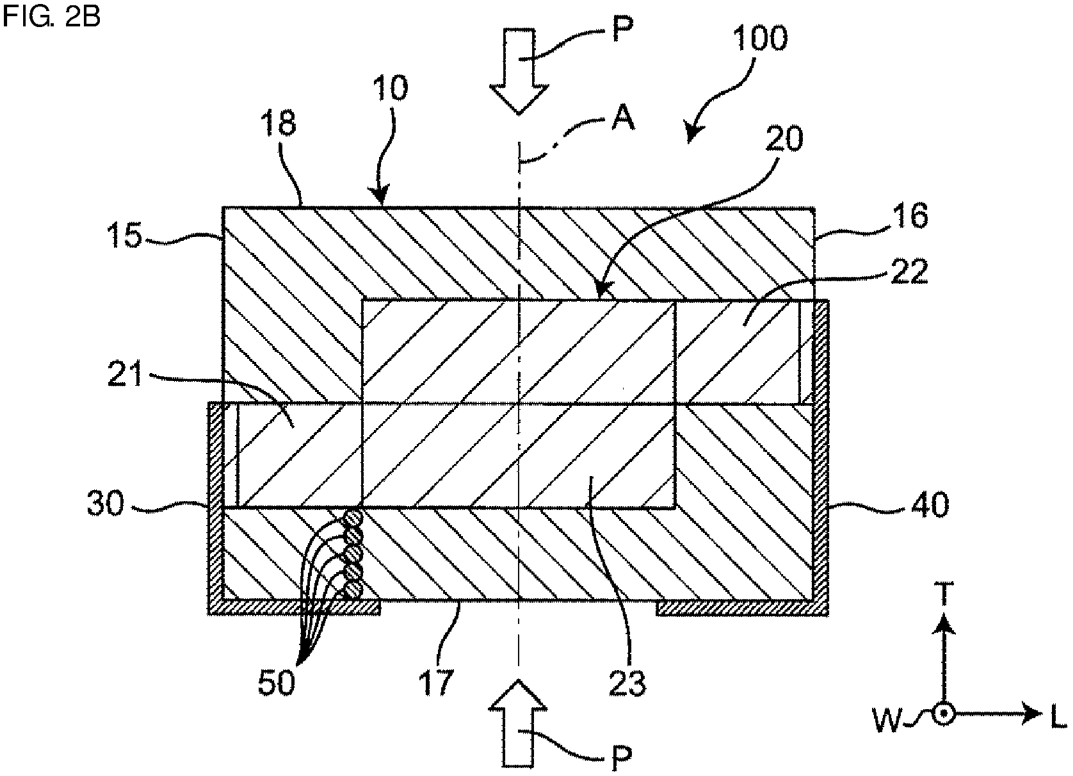
FIG. 2B illustrates the withstanding voltage of a surface mount inductor according to a comparative example.

As illustrated in FIG. 2B, a surface mount inductor 100 according to a comparative example, a coil 20 is disposed in a compact 10 so that an axis A of a wound portion 23 coincides with the direction in which a bottom surface 17 and a top surface 18 of the compact 10 oppose each other. When the compact 10 is to be formed by being pressed in the arrow direction P along the axis A, multiple magnetic powder particles 50 constituting the compact 10 may come into contact with or come close to each other in the arrow direction P than in other directions, and the insulation resistance may be lowered. In this case, the first and second external terminals 30 and 40, disposed on the pressed surface (bottom surface 17), are more likely to short-circuit, for example, the first feeder end portion 21 and the first external terminal 30 therebetween through the multiple magnetic powder particles 50 that come into contact with or come close to each other than in other directions. Thus, the withstanding voltage or ESD resistance may be lowered.

An example of the ESD resistance of the surface mount inductor 1 illustrated in FIG. 2A and the surface mount inductor 100 illustrated in FIG. 2B will now be described. When the applied voltage was sequentially increased from 0.5 kV, through 1.0 kV, 2 kV, and 3 kV, to 4 kV, the surface mount inductor 1 illustrated in FIG. 2A caused a malfunction at 4 kV, whereas the surface mount inductor 100 illustrated in FIG. 2B caused a malfunction at 2 kV. Consequently, the ESD resistance of the surface mount inductor 1 illustrated in FIG. 2A is enhanced to be twice the ESD resistance of the surface mount inductor 100 illustrated in FIG. 2B.

In the first embodiment, preferably, as illustrated in FIG. 1, the portion of the first feeder end portion 21 exposed from the mount surface and the portion of the second feeder end portion 22 exposed from the mount surface extend in opposite directions (the forward direction and the reverse direction of the L direction). Thus, the exposed portion of the first feeder end portion 21 and the exposed portion of the second feeder end portion 22 can be spaced apart from each other, so that the withstanding voltage can be enhanced.

Preferably, the exposed portion of the first feeder end portion 21 extends to the first side surface 15, which is a non-pressed surface adjacent to the mount surface, and the exposed portion of the second feeder end portion 22 extends to the second side surface 16, which is a non-pressed surface adjacent to the mount surface. In this structure, the area of the exposed portion of the first feeder end portion 21 and the area of the exposed portion of the second feeder end portion 22 can be increased. Thus, the contact area between the first and second feeder end portions 21 and 22 and the first and second external terminals 30 and 40 can be increased, and the bonding strength between the first and second feeder end portions 21 and 22 and the first and second external terminals 30 and 40 can be enhanced.

Preferably, the height of a portion of the first external terminal 30 located over the first side surface 15 from the bottom surface 17 is greater than or equal to a quarter of the height of the first side surface 15. This structure can appropriately control the amount of the fillet disposed on the portion of the first external terminal 30 located over the first side surface 15. Preferably, the second external terminal 40 has the similar structure.

On the mount surface of the compact 10, the dimension of the exposed portion of the first feeder end portion 21 in the L direction is preferably greater than or equal to a half of the wire width of the conducting wire of the coil 20. In addition, the dimension of the exposed portion of the first feeder end portion 21 in the W direction is preferably greater than or equal to three quarters of the wire width of the conducting wire of the coil 20. Thus, the bonding strength between the first feeder end portion 21 and the first external terminal 30 can be enhanced. Preferably, the second feeder end portion 22 has the similar structure.

A method for manufacturing the surface mount inductor 1 will now be described.

Figure 3A:
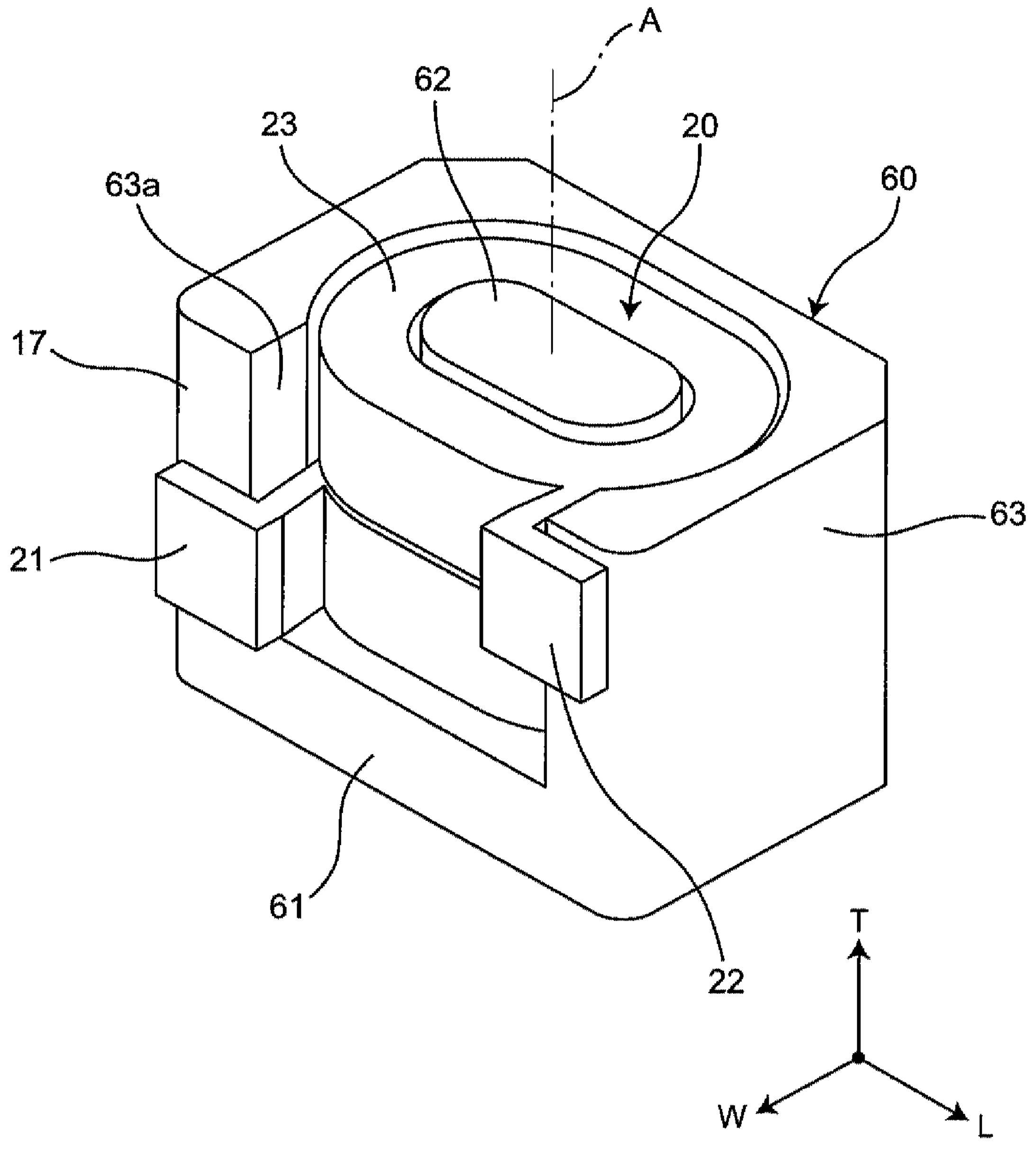
FIG. 3A illustrates a method for manufacturing the surface mount inductor according to the first embodiment.

As illustrated in FIG. 3A, the coil 20 is enclosed in the compact material containing a magnetic powder and a resin. Specifically, the compact material includes a preform compact 60. The preform compact 60 includes a bottom portion 61, a spool portion 62, vertically disposed on the bottom portion 61, and a wall portion 63, disposed on the bottom portion 61 to surround the spool portion 62. A recess 63*a*, which is vertically recessed, is formed in a middle portion of one side of the wall portion 63. The recess 63*a* is formed by cutting one side of the wall portion 63 by half or more of the width of the side.

Then, the inner-diameter hole of the wound portion 23 of the coil 20 allows the spool portion 62 of the preform compact 60 to be inserted thereinto, the first and second feeder end portions 21 and 22 of the coil 20 are drawn from the recess 63*a* to extend along one surface of the wall portion 63 to install the coil 20 in the preform compact 60.

Figure 3B:
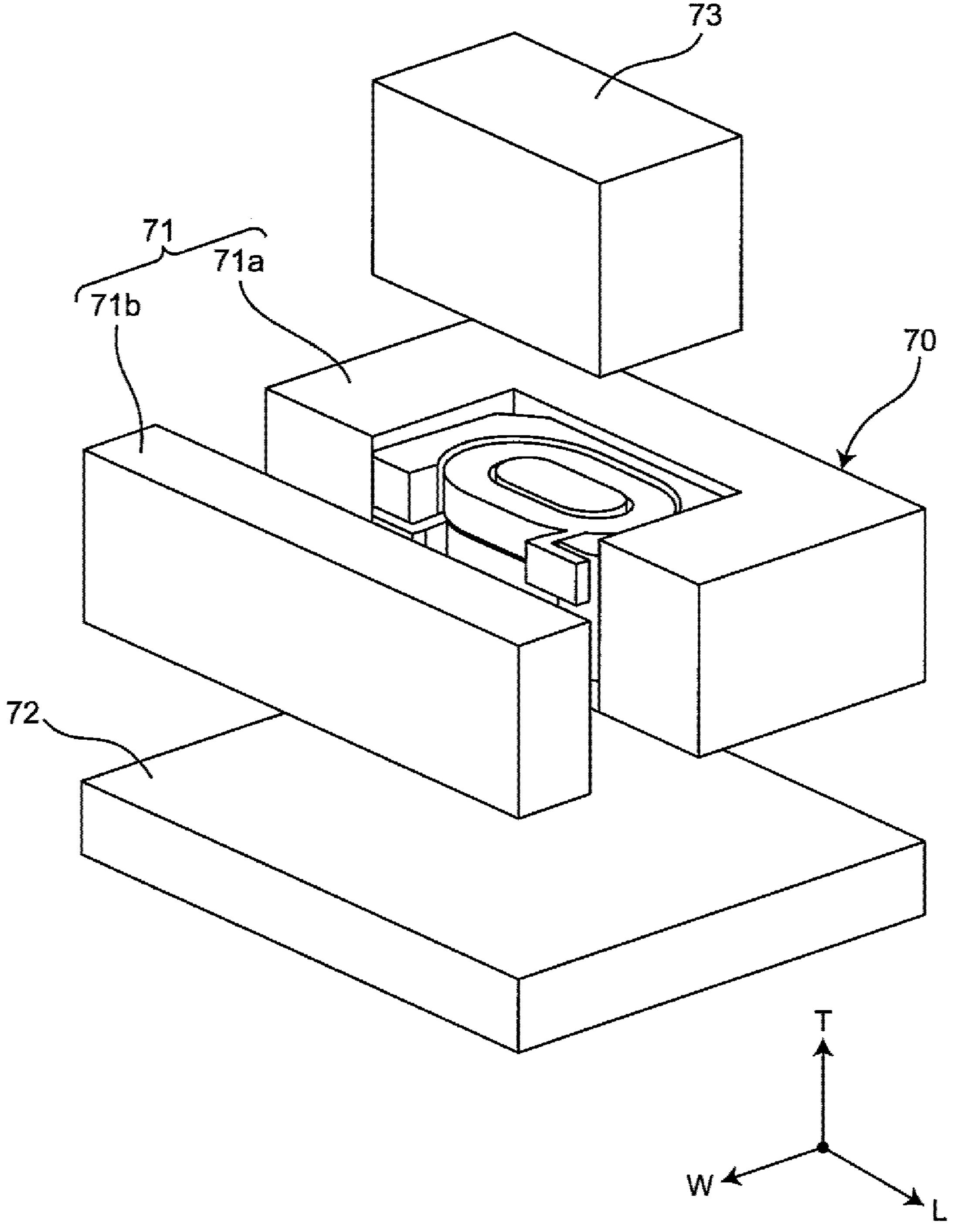
FIG. 3B illustrates a method for manufacturing the surface mount inductor according to the first embodiment.

Then, as illustrated in FIG. 3B, the coil 20 is placed in a die set 70 together with the preform compact 60. The die set 70 includes an upper die 71, including a first die segment 71*a* and a second die segment 71*b*, a lower die 72, and a punch 73. When combined, the upper die 71 and the lower die 72 define a cavity. The coil 20 and the preform compact 60 are disposed in the cavity. Here, the axis A of the wound portion 23 of the coil 20 is disposed to be perpendicular to the lower die 72 (to be aligned with the vertical direction).

Although not illustrated, another preform compact or a powder sealant, serving as a compact material, is placed in the cavity. Thereafter, the punch 73 is lowered into the cavity to apply pressure to the compact material in the direction along the axis A of the coil 20 while heating. Here, the compact material is pressed from above and below by the lower die 72 and the punch 73.

Figure 3C:
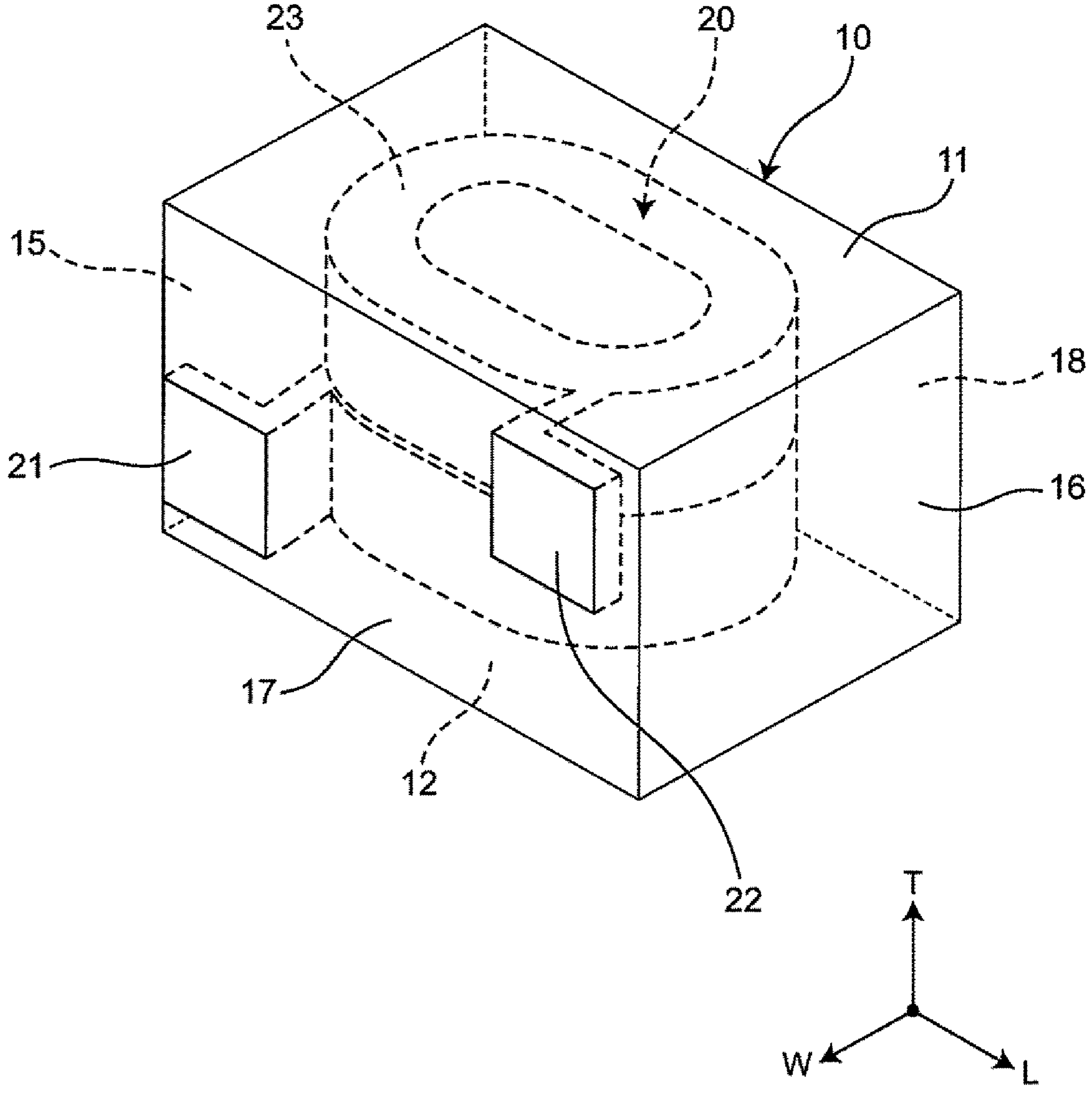
FIG. 3C illustrates a method for manufacturing the surface mount inductor according to the first embodiment.

Thus, the compact material is integrally formed and set, so that the compact 10 that encapsulates the coil 20 therein is formed, as illustrated in FIG. 3C. Here, the first and second feeder end portions 21 and 22 are exposed from the non-pressed surface (bottom surface 17), which is not pressed by the lower die 72 and the punch 73 of the forming die set of the compact 10. Then, as illustrated in FIG. 1, the first and second external terminals 30 and 40 are formed on only the non-pressed surfaces (the first and second side surfaces 15 and 16 and the bottom surface 17) of the compact 10, which are not pressed by the lower die 72 and the punch 73 of the forming die set. Then, the first and second external terminals 30 and 40 are connected to the first and second feeder end portions 21 and 22. The first and second external terminals 30 and 40 are formed by, for example, applying a conductive paste and plating.

Second Embodiment

Figure 4:
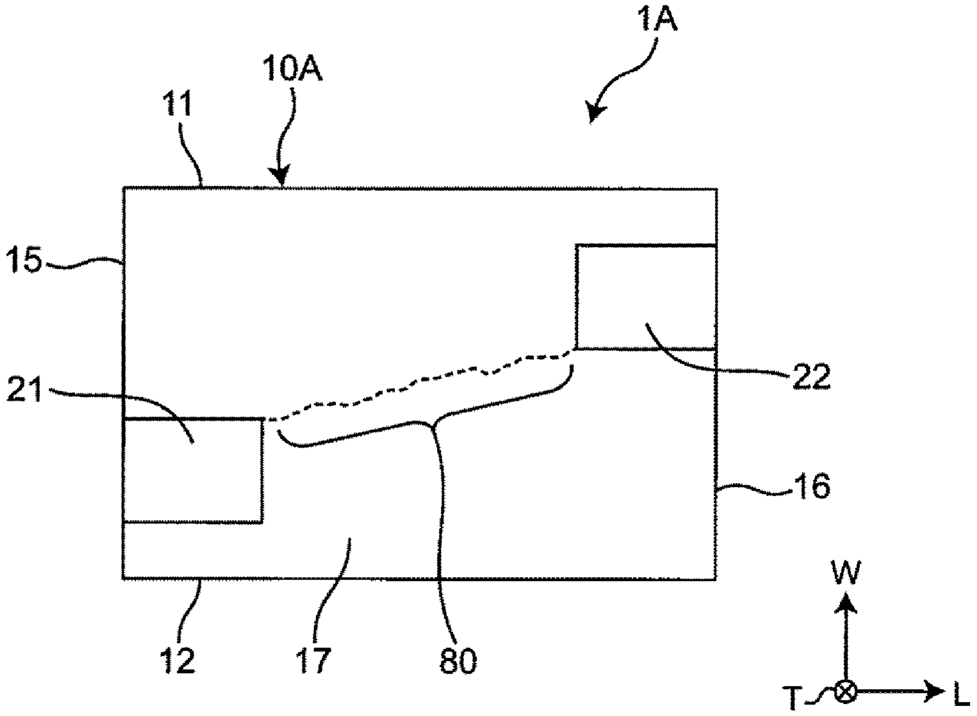
FIG. 4 is a bottom view of a surface mount inductor according to a second embodiment.

FIG. 4 is a bottom view of a surface mount inductor according to a second embodiment. The second embodiment differs from the first embodiment in a component of the compact. This different component will now be described below. Other components are the same as those of the first embodiment, and are thus denoted with the same reference signs as those in the first embodiment without being described.

As illustrated in FIG. 4, in a surface mount inductor 1A according to the second embodiment, an irregular interface 80 is formed on the bottom surface (mount surface) 17 of a compact 10A. FIG. 4 omits illustrations of the external terminals 30 and 40.

The irregular interface 80 includes multiple gaps arranged irregularly. The gaps are areas that do not include a magnetic powder and a resin. The irregular interface 80 can enhance the withstanding voltage at the bottom surface 17 of the compact 10A.

The irregular interface 80 extends from the exposed portion of the first feeder end portion 21 exposed from the bottom surface 17 to the exposed portion of the second feeder end portion 22 exposed from the bottom surface 17. Thus, the irregular interface 80 is disposed between the exposed portions of the two feeder end portions 21 and 22 across which a high voltage is applied, so that the withstanding voltage between the exposed portions of the two feeder end portions 21 and 22 can be enhanced. In addition, the insulation resistance between the exposed portions of the two feeder end portions 21 and 22 can be increased, so that the DC superposition characteristics can be enhanced.

A conceivable reason for why the irregular interface 80 forms is as follows. The irregular interface 80 forms between the exposed portions of the two feeder end portions 21 and 22. Thus, conceivably, a magnetic powder and a resin may fail to be fully filled in or around a middle portion of the recess 63*a* of the preform compact 60 in the pressing direction during pressing of the compact 10A, so that a portion that does not include at least the magnetic powder may form between the exposed portions of the two feeder end portions 21 and 22.

Third Embodiment

Figure 5:
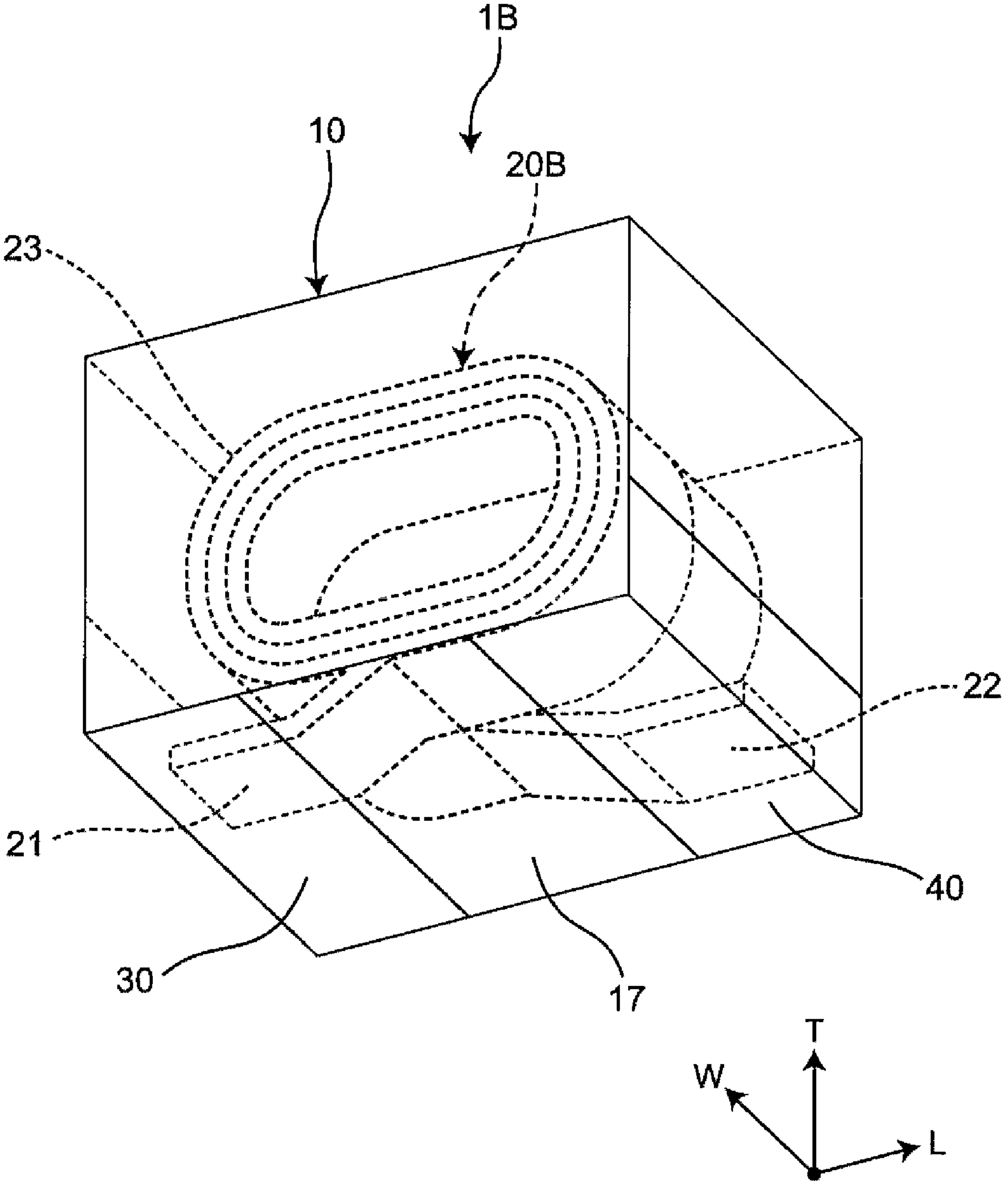
FIG. 5 is a perspective view of a surface mount inductor according to a third embodiment.

FIG. 5 is a perspective view of a surface mount inductor according to a third embodiment. The third embodiment differs from the first embodiment in a component of the coil. This different component will now be described, below. Other components are the same as those of the first embodiment, and thus are denoted with the same reference signs as those of the first embodiment without being described.

As illustrated in FIG. 5, in a coil 20B of a surface mount inductor 1B according to the third embodiment, the first feeder end portion 21 and the second feeder end portion 22 are drawn out from the wound portion 23 so as to cross each other. Thus, as in the case of the first embodiment, the first feeder end portion 21 and the second feeder end portion 22 can be drawn out in the winding direction of the wound portion 23, so that the characteristics of the coil 20 can be enhanced.

The present disclosure is not limited to the above embodiments, and may be changed in design within the scope not departing from the gist of the present disclosure. For example, the characteristic points of the first to third embodiments may be combined in various different manners.

FIG. 1 illustrates the first external terminal 30 and the second external terminal 40 having a substantially letter L shape. However, the first external terminal 30 and the second external terminal 40 may be formed on only the bottom surface 17 of the compact 10, or formed to be in a substantially angular-C shape extending from the bottom surface 17, through a side surface 15 or 16, to the top surface 18.

In the above embodiments, an example of a coil is spirally wound in two layers in a substantially oval shape, but this is not the only possible example. For example, a coil may be wound in more layers, or may have other shapes such as a circle, a rectangle, a sector, a semicircle, a trapezoid, a polygon, or a combination of any of these.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A surface mount inductor, comprising:

a coil including a wound portion and at least one feeder end portion drawn out from the wound portion;

a compact having a plurality of surfaces including a mount surface; and an external terminal on the compact and connected to the coil, wherein the feeder end portion has an exposed portion which is exposed from the mount surface of the compact, the external terminal is on at least one of the plurality of surfaces of the compact and connected to the feeder end portion, the mount surface of the compact includes an irregular interface, the coil has two feeder end portions each corresponding to the feeder end portion, and the irregular interface includes multiple gaps that are arranged irregularly from a corner of the exposed portion of one of the feeder end portions exposed from the mount surface to a corner of the exposed portion of the other feeder end portion exposed from the mount surface.

2. The surface mount inductor according to claim 1, wherein the plurality of surfaces includes two pressed surfaces which oppose each other in a direction of an axis of the wound portion and which are configured by being pressed in the direction of the axis, and a non-pressed surface which is adjacent to the two pressed surfaces and which is not pressed, and the coil is disposed so that the axis of the wound portion parallel to the mount surface of the compact.

3. The surface mount inductor according to claim 2, wherein the exposed portion of one of the feeder end portions exposed from the mount surface and the exposed portion of the other feeder end portion exposed from the mount surface extend in opposite directions.

4. The surface mount inductor according to claim 3, wherein the exposed portion of one of the feeder end portions and the exposed portion of the other feeder end portion extend to respective side surfaces included in a non-pressed surface and adjacent to the mount surface.

5. The surface mount inductor according to claim 4, wherein the external terminal is formed in a substantially letter L shape extending from the mount surface of the compact to a corresponding one of the side surfaces, and a portion of the external terminal disposed on the side surface has a height greater than or equal to a quarter of a height of the side surface.

6. The surface mount inductor according to claim 2, wherein the two feeder end portions are drawn out of the wound portion so as not to cross each other.

7. The surface mount inductor according to claim 1, wherein the external terminal is on only a non-pressed surface of the compact, the exposed portion of the feeder end portion has an extended portion that extends along the external terminal on the mount surface, and a surface of the feeder end portion opposite to an exposed surface of the feeder end portion that contacts the external terminal is within the compact.

8. The surface mount inductor according to claim 7, wherein the exposed portion of one of the feeder end portions exposed from the mount surface and the exposed portion of the other feeder end portion exposed from the mount surface extend in opposite directions.

9. The surface mount inductor according to claim 8, wherein the exposed portion of one of the feeder end portions and the exposed portion of the other feeder end portion extend to respective side surfaces included in a non-pressed surface and adjacent to the mount surface.

10. The surface mount inductor according to claim 7, wherein the two feeder end portions are drawn out of the wound portion so as not to cross each other.

11. The surface mount inductor according to claim 1, wherein the exposed portion of one of the feeder end portions exposed from the mount surface and an exposed portion of the other feeder end portion exposed from the mount surface extend in opposite directions.

12. The surface mount inductor according to claim 11, wherein the exposed portion of one of the feeder end portions and the exposed portion of the other feeder end portion extend to respective side surfaces included in a non-pressed surface of the plurality of surfaces of the compact and adjacent to the mount surface.

13. The surface mount inductor according to claim 12, wherein the external terminal is formed in a substantially letter L shape extending from the mount surface of the compact to a corresponding one of the side surfaces, and a portion of the external terminal disposed on the side surface has a height greater than or equal to a quarter of a height of the side surface.

14. The surface mount inductor according to claim 12, wherein the two feeder end portions are drawn out of the wound portion so as not to cross each other.

15. The surface mount inductor according to claim 11, wherein the two feeder end portions are drawn out of the wound portion so as not to cross each other.

16. The surface mount inductor according to claim 1, wherein the two feeder end portions are drawn out of the wound portion so as not to cross each other.

17. A surface mount inductor, comprising:

a coil including a wound portion and a feeder end portion drawn out from the wound portion;

a compact that contains a magnetic powder and that encapsulates the coil therein; and an external terminal disposed on the compact and connected to the coil, wherein the feeder end portion has an exposed portion which is exposed from a mount surface of the compact and connected to the external terminal, the mount surface of the compact includes an irregular interface, the coil has two feeder end portions each corresponding to the feeder end portion, and the irregular interface includes multiple gaps that are arranged irregularly from a corner of the exposed portion of one of the feeder end portions exposed from the mount surface to a corner of the exposed portion of the other feeder end portion exposed from the mount surface.

* * * * *